Patented Oct. 9, 1945

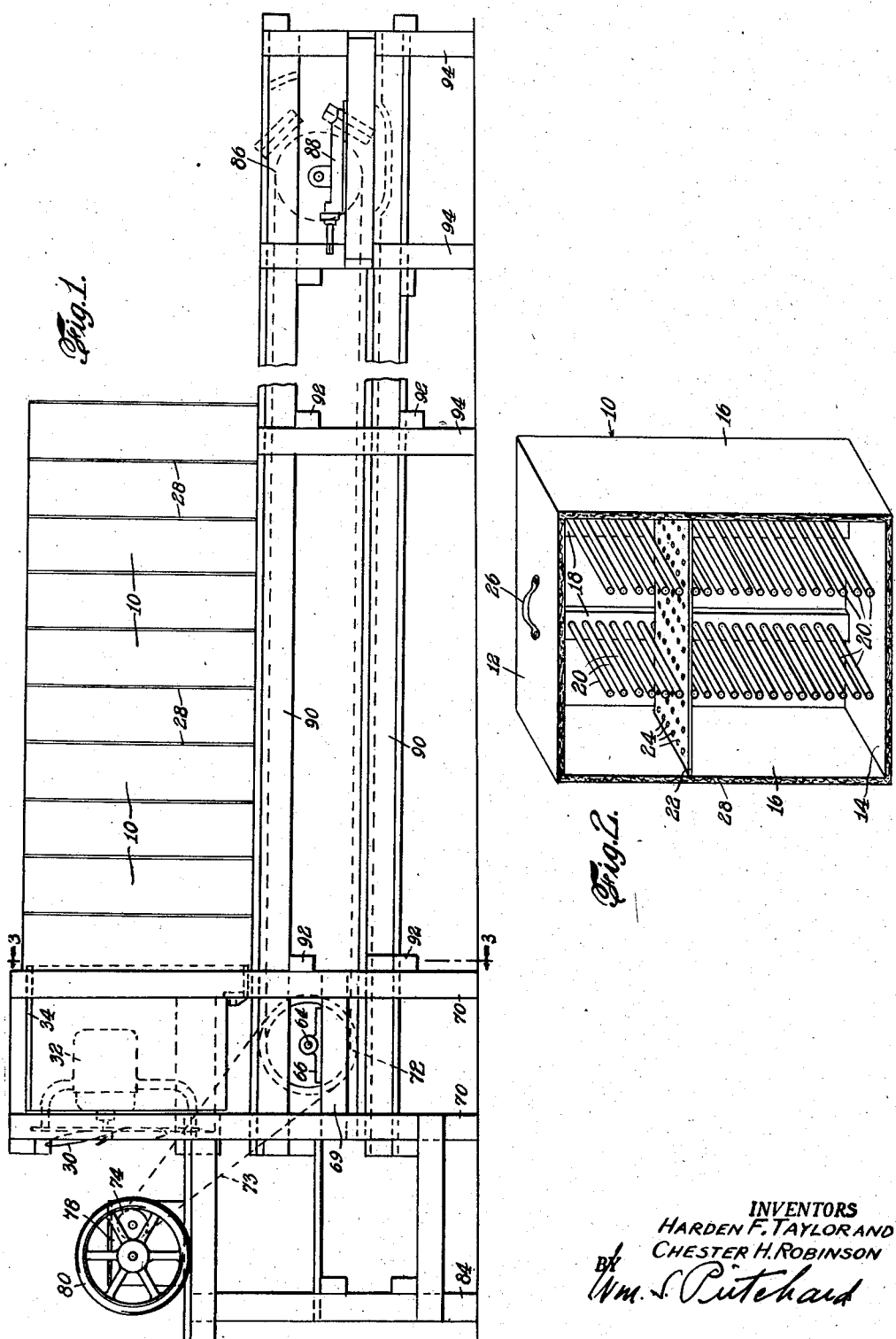

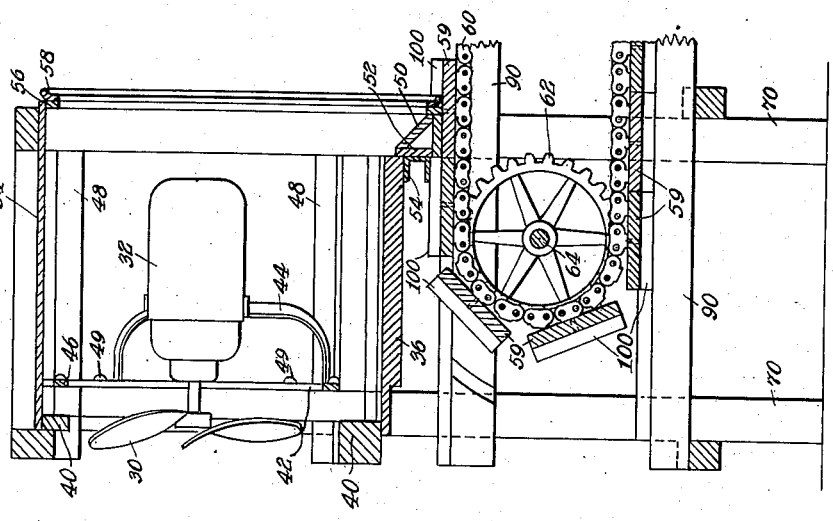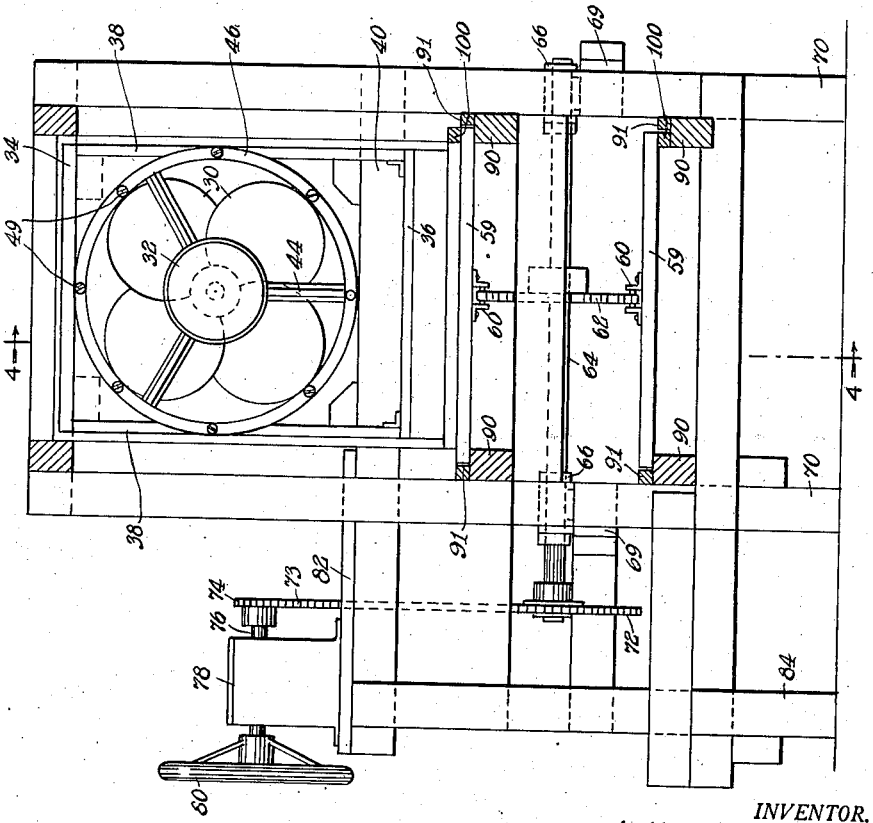

2,386,368

UNITED STATES PATENT OFFICE 2,386,368

CONDITIONING APPARATUS

Harden F. Taylor, New York, and Chester H. Robinson, Jackson Heights, N. Y., assignors to The Atlantic Coast Fisheries Company, New York, N. Y., a corporation of Maine Application February 12, 1944, Serial No. 522,060

7 Claims. (Cl. 34—193)

This invention relates to a drier or conditioning apparatus. More particularly, it relates to a drier having a tunnel formed of a plurality of removable, portable sections.

Though the invention is capable of use for the treatment of various articles of manufacture, it will, without any intent of restriction but only for convenience, be described in connection with the drying and conditioning of vitamin preparations in the form of individual units of predetermined accurate dosage.

According to the procedures set forth in United States patents, Nos. 2,183,053, 2,218,591 and 2,218,592, a liquid emulsion having a continuous phase comprising an aqueous solution of a gellable colloid such as gelatin, with or without a plasticizer, and an internal dispersed phase comprising discrete particles of a vitamin-bearing oil containing a labile vitamin is prepared at an elevated temperature. This emulsion, while still in the liquid state and at an elevated temperature, is formed into the desired shape by molding, in which shape it is caused to gel. The mold is formed with a plurality of depressions for receiving the deposited composition, which depressions are preferably arranged in a regular, uniform geometric pattern of arrangement, such as straight rows, transverse and longitudinal. When the product is of the non-coated variety, after the composition has set to form a firm gel in the depressions it is removed and subjected to a drying and conditioning treatment. When the product is of the type which has a coating, the individual molded units after gelling are removed from the mold in the same geometric arrangement and approximately one-half of the surface of each unit is coated with, for example, a warm aqueous solution of gelatin, the concentration being such that upon cooling the coating will set to form a gel. After the coating has set sufficiently to permit handling, the uncoated portion of each unit is coated with the same aqueous solution of gelatin. Between the two coating operations, the molded units are maintained in the same geometric spaced relationship and, if desired, the semi-coated units may be subjected to a treatment to accelerate the setting of the coating, whereby the coated area may be handled without marring. After the individual units have been completely coated and while in the same spaced geometric relationship, they are subjected to a treatment, whereby the setting of the coating is accelerated and the units conditioned.

In the previously described procedures, storage space and considerable labor and handling in transporting the units to and from storage and to and from the drier or conditioner are required.

An object of this invention is to provide an apparatus having a tunnel, through which a gaseous medium is passed, formed of a plurality of removable sections, each section being portable and constituting means for transporting the units in spaced relationship and temporary storage thereof.

Another object of this invention is to provide a plurality of portable holders which, when aligned in a longitudinal direction and in abutting relationship, will form a tunnel through which a drying or conditioning medium may be passed.

Other objects will become apparent from the following description, appended claims, and accompanying drawings forming a part of this specification illustrating one embodiment of the invention and wherein:

Figure 1 is a side elevation of the apparatus;

Figure 2 is a perspective view of one of the removable and portable sections constituting the tunnel;

Figure 3 is a section taken on the line 3—3 of Figure 1; and

Figure 4 is a partial central section taken on the line 4—4 of Figure 3.

Referring now to the drawings, wherein like reference numerals designate like parts, the reference numeral 10 designates generally a box having a top 12, a bottom 14 and side walls 16. As is shown in Figure 2, the front and back of the holder are open. Secured to the top and bottom and positioned therebetween at the rear of the holder 10, there are provided a pair of spaced strips 18. Each of the strips, which are flush with the edges of the top 12 and bottom 14, is provided with pins 20 arranged in spaced relationship and constituting supports on which trays 22 are positioned. As shown in Figure 2, each tray 22 comprises a strip of any suitable material, such, for example, as "Bakelite," formed with a plurality of holes 24 arranged in a predetermined geometric relationship, each hole being adapted to receive a coated vitamin preparation and engage the same only by its periphery. For reasons which will become apparent, the length of the supporting pins 20 and the width of the trays 22 are each less than the width of the side walls 16.

The holder 10 is made of a size so that it can, even when loaded, be transported manually or otherwise from place to place. To facilitate handling, a handle 26 is provided on the top of the holder 10. For reasons which will become apparent hereafter, the front edges of the holder 10 are provided with a gasket 28.

The construction of the holder 10 is such that when a plurality thereof are arranged longitudinally in series with the front edges of one holder abutting the rear edges of the next adjacently positioned holder, there will be formed a tunnel through which a gaseous medium may be passed, whereby the units carried by the trays 22 may be dried or conditioned as desired. Referring to Figure 1, where such a tunnel is shown, it will be noted that the gasket 28 of each holder 10 is in intimate abutting relationship with the rear edges of the next adjacent holder, whereby the tunnel is made sufficiently tight so that the gaseous medium passing through the tunnel will exercise its intended operation. The positioning of the strips 18 between the top 12 and bottom 14 and the dimensions of the pins 20 and trays 22, as previously described, are for the purpose of permitting the arrangement of the holder 10 to form a tunnel in which the opposing holders are in intimate relationship.

In the embodiment shown in Figure 1, the gaseous medium is forced through the tunnel in the direction of the arrows by an exhaust fan 30 driven by a motor 32. The motor is mounted in a housing comprising the top 34, the bottom 36, and the side walls 38. For increasing the effect of the fan 30, the housing is provided with a closure panel 40, provided with a circular hole 42 of a size slightly larger than the diameter of the blades of the fan 30, and in which the fan operates. Motor supports 44 are secured to a frame 46, which is secured to blocks 48 by screws 49. For reasons which will become apparent hereafter, the bottom of the housing 36 is provided at the forward end with an inclined portion 50 which is carried on an angle 52 secured to an angle 54. The cross-section of the end of the housing corresponds to the cross-section of the holder 10. In order that, when a holder 10 is positioned in abutting relationship to the housing, a relatively tight joint is obtained there is provided a frame 56 which is provided with a gasket 58 adapted to cooperate with the rear edges of the portable holder 10. Thus, when the portable holders are arranged to form the tunnel, the fan 30 will draw the conditioning medium through the tunnel.

In operation, a plurality of holders 10 are arranged in series as shown in Figure 1 and as previously described. After a portable holder 10 has been loaded with trays 22 of the most recently coated material, it is inserted in the tunnel next adjacent the motor housing in which the motor is positioned. This provides an apparatus wherein the counterflow principle is utilized.

To enable the insertion of a new holder 10 as previously described, each of the holders 10 forming the tunnel is positioned on a board 59 secured to a chain conveyer 60, as hereinafter described. The conveyer 60 is driven by a sprocket 62 mounted on a shaft 64 and carried in a pair of bearings 66, each of which is mounted on cross-pieces 69 carried on uprights 70 of the frame that supports the apparatus. The shaft 64 is provided at one end thereof with a sprocket 72 which is driven by a chain 73 from a sprocket 74 mounted on a shaft 76 of a reducing train 78 (details not shown) which is actuated by a hand wheel 80. The reducing gear 78 is mounted on a platform 82 carried by the vertical uprights 70 and 84 of the frame. The chain 60 is also trained over an idler sprocket 86 mounted in adjustable bearing blocks 88, whereby the tension of the chain may be maintained on proper adjustment. The chain 60 is guided in its forward and return flights by flanged rails 90 extending longitudinally at each side of the conveyer and carried on cross-pieces 92 mounted on the uprights 70 and the uprights 94, the flanges 91 serving to prevent lateral shifting of the boards 59.

As shown in Figure 4, each board 59 is of a width equal to the width of three links of the chain 60 and is secured to the middle link of the three links of the chain over which it extends. In order to properly position each portable holder on the conveyer, each board 59 is provided with a flange 100 at the rear end thereof. It is to be noted that the rails 90 are positioned to accommodate such flanges.

As is apparent from the drawings, the motor housing is carried on the frame and disposed above the sprocket 62 so that it will provide sufficient clearance and not engage any board 59 passing around the sprocket wheel 62 prior to assuming its horizontal position. The dimensions of the housing and sprocket are such that the boards will have assumed a horizontal position prior to passing beneath the incline 50 of the bottom of the housing. Sufficient clearance between the incline 50 and the boards 59 is provided.

In operation, the newly coated units come from the coating machine positioned in the holes 24 of the trays 22. The trays are inserted in position on the supports 20 of a portable holder 10, which is usually in close proximity to the coating machine. When a holder is loaded with such trays, it is transported by being carried to the drier or conditioning apparatus where it is positioned on a board 59 of the conveyer 60, with the gasket 58 of the end frame 56 of the housing in close intimate contact with the rear edges of the holder 10. When a second holder 10 is filled with trays of newly coated units, as previously described, and it is desired to position it in place, the hand wheel 80 is manually actuated to advance the conveyer forwardly. After the conveyer and the holder next adjacent the housing have been advanced sufficiently, the holder containing the recently coated materials is inserted adjacent the end frame 56 of the housing in the manner previously described. It will be noted that the rear edges of the second holder will be opposed to the front edges of the previously positioned holder. The hand wheel 80 is then operated to drive the conveyer rearwardly, with the result that the rear edges of the holder 10 will be brought in intimate abutting contact with the gasket on the end frame, and the gasket of the previously provided holder will be brought in intimate abutting contact with the rear edges of the newly disposed portable holder. This procedure is repeated as often as necessary, the tunnel being large or small depending on the number of holders constituting the same. After the holder at the free end of the tunnel (remotest to the fan) has been in the tunnel formation for a sufficient length of time to effect the desired treatment, it is removed without disturbing the tunnel formation of the other holders.

The frame, the fan, the housing, and the conveyer, are positioned in a room which is maintained under proper conditions of temperature and humidity, and it is this atmosphere which is caused to be drawn through the tunnel at an accelerated rate of speed. The atmosphere, after passing through the tunnel, is exhausted into the room but, due to the fact that the atmosphere of this room is continually being changed to maintain it under predetermined conditions, it has no appreciable effect thereon.

The portable holders 10 comprise a temporary storage in that as the units are removed from the coating apparatus they may remain therein until the next operation or they may be transported to and made a section of the tunnel. After the contents of any holder has been sufficiently treated, the holder need not be removed from the tunnel until the next operation is to be performed on the units. Even after removal of a holder from the tunnel, the contents may be kept therein until the next operation is to be performed on the contents. Due to the fact that the newly coated units are positioned in the holder as previously described, the various operations are performed with a minimum of handling of the individual units, whereby harmful injury to the coated units is avoided.

Though in the preferred embodiment of this invention, the housing and holders are formed of wood, any other suitable material may be used.

In the description, "gaskets" are described as being utilized to form the joints between adjacent sections. The invention is not restricted thereto. In general, any means for producing a joint between the sections as is necessary to give satisfactory results may be utilized. For example, in place of the gaskets, a band of suitable material may be provided into which the next adjacent holder may be positioned. Likewise, the invention is not restricted to the specific trays and the supports in the holder on which they are positioned. Any suitable means, as, for example, strips secured to the interior of the side walls, may be utilized, and any other construction of trays may be used. The invention is furthermore not restricted to the specific means described for moving the conveyer, since it is obvious that other means, and indeed power-driven means, may be utilized.

The invention has been described in connection with drying or conditioning of freshly formed or coated molded vitamin units. It is to be understood that the invention is not restricted thereto. In general, the principles of the invention may be used for the treatment of any substance with a gaseous medium. Though in some instances changes in specific construction, but not in principle, may be necessary due to the materials being treated, such changes will be apparent to and can readily be made by a person skilled in the art.

In the claims, the term "conditioning apparatus" is intended to define broadly an apparatus which is adapted to change the moisture content or temperature of the materials undergoing treatment therein. Also, in the claims, the term "tight joint" is intended to define a joint which will permit satisfactory operation of the apparatus even though there may be some leakage therethrough.

Since it is obvious that many changes and modifications can be made in the above-described details without departing from the nature and spirit of the invention, it is to be understood that the invention is not to be limited thereto except as set forth in the appended claims.

We claim:

1. A conditioning apparatus comprising a pair of parallel spaced sprockets, a conveyer trained over said sprockets, means to drive at least one of said sprockets, a plurality of supports secured to said conveyer, each of said supports being secured to said conveyer, a plurality of individual hollow sections arranged on said supports in series to form a tunnel, each section being portable and having means to carry the material to be treated, a housing adapted to communicate with one end of said tunnel, the other end of said tunnel being free whereby the section at the free end can be removed without affecting the arrangement of other sections, means to mount said housing above one of said sprockets to permit each of said supports to pass around said sprocket and assume its horizontal position prior to passing beneath said housing, and a fan in said housing to draw a conditioning means through said tunnel.

2. A conditioning apparatus comprising a pair of parallel spaced sprockets, a conveyer trained over said sprockets, means to drive at least one of said sprockets, a plurality of supports secured to said conveyer, each of said supports being secured to said conveyer, a plurality of individual hollow sections arranged on said supports in series to form a tunnel, means forming a tight joint between adjacent sections when said tunnel is in operative position, each section being portable and having means to carry the material to be treated, a housing adapted to communicate with one end of said tunnel, the other end of said tunnel being free whereby the section at the free end can be removed without affecting the arrangement of other sections, means forming a tight joint between said housing and the section adjacent thereto, means to mount said housing above one of said sprockets to permit each of said supports to pass around said sprocket and assume its horizontal position prior to passing beneath said housing, and a fan in said housing to draw a conditioning means through said tunnel.

3. A conditioning apparatus comprising a pair of parallel spaced sprockets, a conveyer trained over said sprockets, means to drive at least one of said sprockets, a plurality of supports secured to said conveyer, each of said supports being secured to said conveyer, a plurality of individual hollow sections arranged on said supports in series to form a tunnel, means forming a tight joint between adjacent sections when said tunnel is in operative position, said means comprising a gasket on one of the adjacent sections, each section being portable and having means to carry the material to be treated, a housing adapted to communicate with one end of said tunnel, the other end of said tunnel being free whereby the section at the free end can be removed without affecting the arrangement of other sections, means forming a tight joint between said housing and the section adjacent thereto, said means comprising a gasket on said housing, means to mount said housing above one of said sprockets to permit each of said supports to pass around said sprocket and assume its horizontal position prior to passing beneath said housing, and a fan in said housing to draw a conditioning means through said tunnel.

4. A conditioning apparatus comprising a pair of parallel spaced sprockets, a conveyer trained over said sprockets, means to drive at least one of said sprockets, a plurality of supports secured to said conveyer, each of said supports being secured to said conveyer and adapted, when the conveyer is in its horizontal flight, to have the leading and trailing edges thereof in close relationship to the respective trailing and leading edges of the preceding and succeeding supports, a plurality of individual hollow sections arranged on said supports in series to form a tunnel, each section being portable and having means to carry the material to be treated, a housing adapted to communicate with one end of said tunnel, the other end of said tunnel being free whereby the section at the free end can be removed without affecting the arrangement of other sections, said housing having an inclined portion at the forward end of the bottom thereof, said forward end being of the same cross-section as the sections, means to mount said housing above one of said sprockets to permit each of said supports to pass around said sprocket and assume its horizontal position prior to passing beneath said inclined portion, and a fan in said housing to draw a conditioning means through said tunnel.

5. A conditioning apparatus comprising a pair of parallel spaced sprockets, a conveyer trained over said sprockets, means to drive at least one of said sprockets, a plurality of supports secured to said conveyer, each of said supports being secured to said conveyer and adapted, when the conveyer is in its horizontal flight, to have the leading and trailing edges thereof in close relationship to the respective trailing and leading edges of the preceding and succeeding supports, a plurality of individual hollow sections arranged on said supports in series to form a tunnel, means on each of said supports to properly position the section thereon, each section being portable and having means to carry the material to be treated, a housing adapted to communicate with one end of said tunnel, the other end of said tunnel being free whereby the section at the free end can be removed without affecting the arrangement of other sections, said housing having an inclined portion at the forward end of the bottom thereof, said forward end being of the same cross-section as the sections, means to mount said housing above one of said sprockets to permit each of said supports to pass around said sprocket and assume its horizontal position prior to passing beneath said inclined portion, and a fan in said housing to draw a conditioning means through said tunnel.

6. A conditioning apparatus comprising a pair of parallel spaced sprockets, a conveyer trained over said sprockets, means to drive at least one of said sprockets, a plurality of supports secured to said conveyer, each of said supports being secured to said conveyer and adapted, when the conveyer is in its horizontal flight, to have the leading and trailing edges thereof in close relationship to the respective trailing and leading edges of the preceding and succeeding supports, a plurality of individual hollow sections arranged on said supports in series to form a tunnel, a flange on each of said supports to properly position the section thereon, each section being portable and having means to carry the material to be treated, a housing adapted to communicate with one end of said tunnel, the other end of said tunnel being free whereby the section at the free end can be removed without affecting the arrangement of other sections, said housing having an inclined portion at the forward end of the bottom thereof, said forward end being of the same cross-section as the sections, means to mount said housing above one of said sprockets to permit each of said supports to pass around said sprocket and assume its horizontal position prior to passing beneath said inclined portion, and a fan in said housing to draw a conditioning means through said tunnel.

7. A conditioning apparatus comprising a pair of parallel spaced sprockets, a conveyer trained over said sprockets, means to drive at least one of said sprockets, a plurality of supports secured to said conveyer, each of said supports being secured to said conveyer and adapted, when the conveyer is in its horizontal flight, to have the leading and trailing edges thereof in close relationship to the respective trailing and leading edges of the preceding and succeeding supports, a plurality of individual hollow sections arranged on said supports in series to form a tunnel, a flange on each support to properly position the section thereon, means forming a tight joint between adjacent sections when the tunnel is in operative position, each section being portable and having means to carry the material to be treated, a housing adapted to communicate with one end of said tunnel, the other end of said tunnel being free whereby the section at the free end can be removed without affecting the arrangement of other sections, said housing having an inclined portion at the forward end of the bottom thereof, said forward end being of the same cross-section as the sections, means on said forward end to form a tight joint between said housing and the section adjacent thereto when the tunnel is in operative position, means to mount said housing above one of said sprockets to permit each of said supports to pass around said sprocket and assume its horizontal position prior to passing beneath said inclined portion, and a fan in said housing to draw a conditioning means through said tunnel.

HARDEN F. TAYLOR.
CHESTER H. ROBINSON.